(12) United States Patent
Olson et al.

(10) Patent No.: US 8,967,008 B2
(45) Date of Patent: Mar. 3, 2015

(54) LAYSHAFT AUTOMATIC TRANSMISSION (75) Inventors: Bret M. Olson, Whitelake, MI (US); Edward W. Mellet, Rochester Hills, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 375 days.

(21) Appl. No.: 13/312,429

(22) Filed: Dec. 6, 2011

(65) Prior Publication Data

US 2013/0139646 A1 Jun. 6, 2013

(51) Int. Cl.
*F16H 3/08* (2006.01)

(52) U.S. Cl.
USPC .......................................................... 74/331

(58) Field of Classification Search
CPC ................. F16H 2003/093; F16H 2003/0931; F16H 2200/0047
USPC .................................................. 74/330, 331
See application file for complete search history.

(56) References Cited

U.S. PATENT DOCUMENTS

| | | | | |
|---|---|---|---|---|
| 6,250,171 B1 * | 6/2001 | Sperber et al. | ................... | 74/331 |
| 8,342,048 B2 * | 1/2013 | Rieger | ............. | 74/330 |
| 2009/0272212 A1 * | 11/2009 | Raszkowski | ................... | 74/331 |
| 2010/0251844 A1 * | 10/2010 | Ross et al. | ...................... | 74/340 |

* cited by examiner

*Primary Examiner* — Ha D Ho (57) ABSTRACT

A transmission includes a housing, an input member connectable to an engine output member, a sleeve member, and a launch clutch assembly connected to the input member and to the sleeve member, wherein the launch clutch is selectively engageable to transmit torque from the input member to the sleeve member. A first countershaft is rotatably supported within the transmission housing. A second countershaft is rotatably supported within the transmission housing. A plurality of co-planar gear sets are connected to the input member, sleeve member, and the countershafts. A plurality of torque transmitting mechanisms are provided for coupling various components of the co-planar gear sets to the input member, sleeve member, and countershafts. The selective engagement of the launch clutch assembly and the torque transmitting mechanisms establishes at least one of five forward speed ratios and a reverse speed ratio.

15 Claims, 9 Drawing Sheets

LAYSHAFT AUTOMATIC TRANSMISSION

FIELD

The present disclosure relates to transmissions for motor vehicles and more particularly to automatic transmissions having one or more layshafts and having a compact design and which provides multiple forward speeds or gears.

BACKGROUND

The statements in this section merely provide background information related to the present disclosure and may or may not constitute prior art.

Dual clutch transmissions are a relatively recent addition to the stable of motor vehicle transmissions which previously included manual, continuously variable and automatic transmissions. Dual clutch transmissions or DCT's as they are now commonly known, combine good fuel economy with rapidly executed shifts. From a performance standpoint, therefore, they closely duplicate the feel and operation of a conventional mechanical transmission. Additionally, they may be configured to operate as an essentially automatic or manual transmission and thus exhibit exceptional versatility.

Structurally, dual clutch transmissions typically include an input shaft which drives a pair of mutually exclusively engaged input clutches. The input clutches drive a pair of countershafts which each include a plurality of gears freely rotatably disposed on the countershafts and associated synchronizer clutches. The pluralities of gears are in constant mesh with gears secured to an output shaft. Activation of a synchronizer clutch synchronizes and couples a selected gear to its countershaft. Then, the input clutch associated with that countershaft is engaged to transmit torque from the input shaft to the output shaft. Because clutches, gears and synchronizers are disposed or stacked along the countershafts, the axial length of dual clutch transmissions can create packaging issues, particularly in smaller vehicles.

While there are various ways to classify or categorize dual clutch transmissions, one approach to classification relates to the type of clutch utilized in the transmission: wet or dry. A wet dual clutch transmission contains lubricating transmission fluid not only in the gear and synchronizer section but also in the input clutches. A dry dual clutch transmission, of course, includes transmission fluid in the gear and synchronizer section but not in the clutches. While wet dual clutch transmissions offer slightly better durability and longer clutch life because of the cooling provided by the transmission fluid, they exhibit higher spin losses. Moreover, the incorporation of a lubrication pump which provides pressurized lubricating and cooling fluid further affects overall efficiency. Accordingly, wet dual clutch transmissions, all other parameters being equal, typically exhibit slightly lower fuel economy than dry dual clutch transmissions.

From the foregoing, it is apparent that improvements addressing both packaging and efficiency issues of dual clutch transmissions are both desirable and possible. The present invention is so directed.

SUMMARY

A layshaft automatic transmission is provided. The transmission includes a transmission housing, an input member connectable to an engine output member, a sleeve member at least partially concentric with the input member and at least partially surrounds the input member, a launch clutch assembly connected to the input member and to the sleeve member, wherein the launch clutch is selectively engageable to transmit torque from the input member to the sleeve member, a first drive gear rotatably fixed for common rotation with the sleeve member, and a second drive gear rotatably fixed for common rotation with the input member. A first countershaft is rotatably supported within the transmission housing and is spaced apart from and parallel with the input member and the sleeve member. A second countershaft is rotatably supported within the transmission housing and is spaced apart from and parallel with the input member and the sleeve member. A first driven gear is rotatably fixed for common rotation with the first countershaft and is in mesh with the first drive gear, a second driven gear is selectively connectable for common rotation with the first countershaft and is in mesh with the second drive gear, a third driven gear is selectively connectable for common rotation with the second countershaft and is in mesh with the second drive gear, a fourth driven gear is selectively connectable for common rotation with the second countershaft and in mesh with the first driven gear, a first output gear is selectively connectable for common rotation with the first countershaft, a second output gear is selectively connectable for common rotation with the first countershaft, a third output gear is selectively connectable for common rotation with the second countershaft, and a fourth output gear is selectively connectable for common rotation with the second countershaft. A plurality of torque transmitting mechanisms are provided for coupling various combinations of the drive gears, driven gears, and output gears to the input member, sleeve member, and countershafts. The selective engagement of the launch clutch assembly and the torque transmitting mechanisms establishes at least one of five forward speed ratios and a reverse speed ratio.

In one aspect of the present invention the torque transmitting mechanisms include two clutches and three synchronizer assemblies and a launch device.

In another aspect of the present invention the torque transmitting mechanisms include two clutches, two synchronizer assemblies, a dog clutch and a launch device.

In another aspect of the present invention the torque transmitting mechanisms include three synchronizers.

In yet another aspect of the present invention the launch device is a dry clutch.

In yet another aspect of the present invention the launch device is a wet clutch.

In yet another aspect of the present invention the launch device is a fluid coupling.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

It will be appreciated that in all of the drawings, certain components, for example, the output gears, the differential assembly and the output shafts or axles have been rotated out of radial position or gear sizes or shaft spacings have been altered in order to illustrate the components, their locations and interconnections more clearly.

DETAILED DESCRIPTION

The following description is merely exemplary in nature and is not intended to limit the present disclosure, application, or uses.

Figure 1:
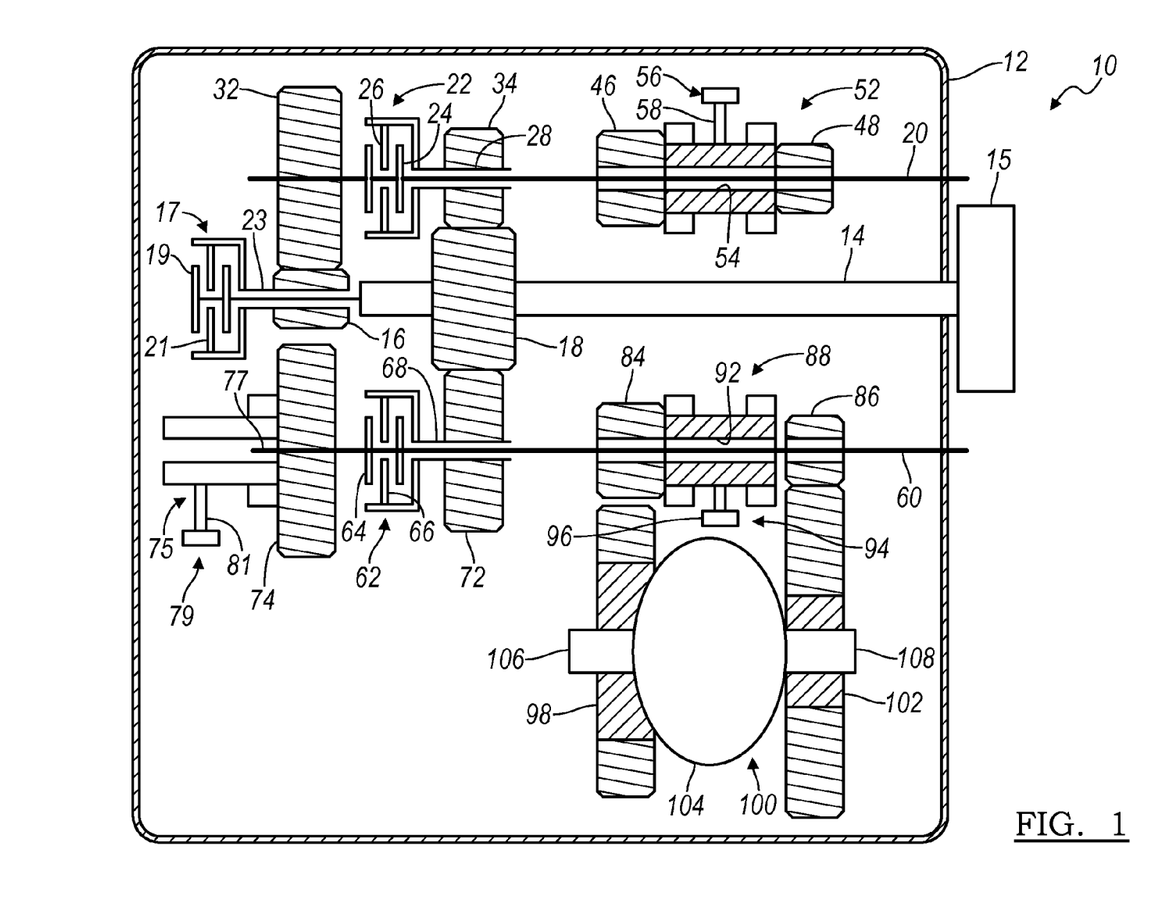
FIG. 1 is a diagrammatic view of an embodiment of a five speed layshaft transmission.

With reference to FIG. 1, a five speed transmission is illustrated and generally designated by the reference number 10. The five speed dual clutch transmission 10 includes a housing 12 having various bores, openings, flanges and features that receive, locate, support and protect the components of the transmission 10. The housing 12 rotatably supports an input shaft 14. The input shaft 14 is coupled at one end to a flywheel damper assembly 15. The flywheel damper assembly 15 receives input torque from a prime mover (not shown), such as a combustion engine, a hybrid engine, or an electric motor. The input shaft 14 is coupled at an opposite end to a launch clutch 17. The launch clutch 17 includes a first plurality of clutch plates or discs 19 coupled to the input shaft 14 for rotation therewith. Interleaved with the first plurality of clutch plates or discs 19 is a second plurality of clutch plates or discs 21 that are coupled to and rotate with a quill or drive tube 23. The launch clutch 17 is engageable to selectively transfer torque from the input shaft 14 to the drive tube 23. A first, smaller input drive gear 16 is rotatably fixed to the drive tube 23 and a second, larger input drive gear 18 is fixed to the input shaft 14. It should be appreciated that the terms "smaller" and "larger" with reference to gear sizes are utilized herein only in the most relative and general sense and primarily for the purpose of locating or identifying the gears in the respective drawing Figures. Accordingly, it should be understood that the actual gear sizes, and their relative sizes, may vary from such descriptions in order to achieve certain or specific gear ratios and/or speed changes.

Also rotatably supported in the housing 12 is a first layshaft or countershaft 20 associated with the odd numbered gears: first, third and fifth and a second layshaft or countershaft 60 associated with the even numbered gears: second and fourth and reverse. However, there may be arrangements that benefit from mixing odd and even gears on a layshaft/countershaft and the above description by no means limits the scope of the invention. The first countershaft 20 and the second countershaft 60 are parallel to and spaced from the input shaft 14. At one end of the first countershaft 20 is a first, wet input clutch assembly 22 having a first plurality of clutch plates or discs 24 coupled to the first countershaft 20 for rotation therewith. Interleaved with the first plurality of clutch plates or discs 24 is a second plurality of clutch plates or discs 26 that are coupled to and rotate with a first quill or drive tube 28. The first wet clutch assembly 22 is engageable to selectively transfer torque from the first quill or drive tube 28 to the first countershaft 20.

Freely rotatably disposed on the first countershaft 20 is a first, larger driven gear 32 in constant mesh with the first, smaller input drive gear 16. Freely rotatably disposed on the first drive tube 28 is a second, smaller driven gear 34 in constant mesh with the second, larger input gear 18. Disposed between the first, larger driven gear 32 and the second, smaller driven gear 34 is the first wet, input clutch assembly 22.

Freely rotatably disposed on the first countershaft 20 is a third, larger drive gear 46 and a fourth, smaller drive gear 48 axially spaced from the third drive gear 46. Disposed between the third, larger drive gear 46 and the fourth, smaller drive gear 48 is a first double synchronizer clutch assembly 52. The first synchronizer clutch assembly 52 is rotationally coupled to the first countershaft 20 by a first interengaging synchronizer 54 and is free to translate axially along the first countershaft 20. A first shift actuator assembly 56 which may be mechanical, hydraulic, electric or pneumatic, includes an output member and shift fork assembly 58 that engages and bi-directionally translates the first synchronizer clutch assembly 52. When translated to the right or left from a neutral center position, the first synchronizer clutch assembly 52 first synchronizes the speed of the adjacent gear, either the gear 48 to the right or the gear 46 to the left, and then positively couples the synchronized gear to the first countershaft 20.

At one end of the second countershaft 60 is a second, wet input clutch assembly 62 having a first plurality of clutch plates or discs 64 coupled to the second countershaft 60 for rotation therewith. Interleaved with the first plurality of clutch plates or discs 64 is a second plurality of clutch plates or discs 66 that are coupled to and rotate with a second quill or drive tube 68. The second wet input clutch assembly 62 is engageable to selectively transfer torque from the second quill or drive tube 68 to the second countershaft 60.

Freely rotatably disposed on the second quill or drive tube 68 is a fifth, driven gear 72 in constant mesh with the second, larger input drive gear 18 and a sixth, driven gear 74 in constant mesh with the first, larger driven gear 32. Disposed between the fifth, driven gear 72 and the sixth, driven gear 74 is the second, wet input clutch assembly 62.

Disposed adjacent the sixth, driven gear 74 is a reverse dog clutch or single sided synchronizer clutch assembly 75. The synchronizer clutch 74 is rotationally coupled to the second countershaft 60 by an synchronizer 77 and is free to translate axially along the second countershaft 60. A shift actuator assembly 79 which may be hydraulic, electric or pneumatic, includes an output member and shift fork assembly 81 that engages and bi-directionally translates the synchronizer clutch assembly 75. When translated to the right from a neutral center position, the synchronizer clutch assembly 75 first synchronizes the speed of the adjacent gear 74 and then positively couples the synchronized gear to the second countershaft 60.

Freely rotatably disposed on the second countershaft 60 is a seventh, larger drive gear 84 and an eighth, smaller drive gear 86 axially spaced from the seventh drive gear 84. Disposed between the seventh, larger drive gear 84 and the eighth, smaller drive gear 86 is a second double synchronizer clutch assembly 88. The second synchronizer clutch 88 is rotationally coupled to the second countershaft 60 by synchronizer 92 and is free to translate axially along the second countershaft 60. A second shift actuator assembly 94 which may be mechanical, hydraulic, electric or pneumatic, includes an output member and shift fork assembly 96 that engages and bi-directionally translates the second synchronizer clutch assembly 88. When translated to the right or left from a neutral center position, the second synchronizer clutch assembly 88 first synchronizes the speed of the adjacent gear, either the gear 86 to the right or the gear 84 to the left, and then positively couples the synchronized gear to the second countershaft 60.

The third, larger drive gear 46 and the seventh, larger drive gear 84 both are in constant mesh with and drive a first output or ring gear 98 that is associated with and is an input member to a differential assembly 100. Similarly, the fourth, smaller drive gear 48 and the eighth, smaller driven gear 86 both are in constant mesh with and drive a second output or ring gear 102 that is also associated with and is an input member to the differential assembly 100. The differential 104 is coupled to a respective pair of axles or output shafts 106 and 108

In the embodiment illustrated in FIG. 1, the first, larger driven gear 32 is associated and active with first gear and reverse, the second, smaller driven gear 34 is associated and active with third and fifth gears, the third, larger drive gear 46 is associated and active with fifth gear and the fourth, smaller drive gear 48 is associated and active with first and third gears. The fifth, driven gear 72 is associated and active with second and fourth gears, the sixth, driven gear 74 is associated and active with reverse, the seventh, larger drive gear 84 is associated and active with fourth gear and the eighth, smaller drive gear 86 is associated and active with second gear and reverse.

To engage first gear, the first double synchronizer clutch assembly 52 is translated to the right to synchronize and connect the gear 48 to the first countershaft 20. The launch clutch 17 may then be engaged to transfer drive torque from the input shaft 14, through the gears 16, 32 and 48 to the output gear 102, the differential assembly 100 and the axles or output shafts 104 and 106.

To engage second gear, the second double synchronizer clutch assembly 88 is translated to the right to synchronize and connect the gear 86 to the second countershaft 60. The second input clutch assembly 62 may then be engaged to transfer drive torque from the input shaft 14, through the gears 18, 72 and 86 to the output gear 102, the differential assembly 100 and the axles or output shafts 104 and 106.

To engage third gear, the first double synchronizer clutch assembly 52 is translated to the right to connect the gear 48 to the first countershaft 20. The first input clutch assembly 22 is then engaged to transfer drive torque from the input shaft 14, through the gears 18, 34 and 48 to the output gear 102, the differential assembly 100 and the axles or output shafts 104 and 106.

To engage fourth gear, the second double synchronizer clutch assembly 88 is translated to the left to connect the gear 84 to the second countershaft 60. The second input clutch assembly 62 is then engaged to transfer drive torque from the input shaft 14, through t the gears 18, 72 and 84 to the output gear 98, the differential assembly 100 and the axles or output shafts 104 and 106.

To engage fifth gear, the first synchronizer clutch assembly 52 is translated to the left to engage the gear 46 and connect it to the first countershaft 20. The first input clutch assembly 22 is then engaged to transfer drive torque from the input shaft 14, through the gears 18, 34 and 46 to the output gear 98, the differential assembly 100 and the axles or output shafts 104 and 106.

Reverse is achieved by translating the synchronizer clutch assembly 79 to the right to engage the gear 74 and connect it to the second countershaft 60 and translating the second synchronizer clutch assembly 88 to the right to engage the gear 86 and connect it to the second countershaft 60. It is also possible to use a dog clutch or a sliding reverse configuration in place of the synchronized reverse. The launch clutch 17 is then engaged to transfer drive torque from the input shaft 14, through the gears 16, 32, 74 and 86 to the output gear 102, the differential assembly 100 and the axles or output shafts 104 and 106. It should be clear that there are instances where a stepped gear configuration can be used, for example to achieve a proper reverse gear while maintaining an optimum package. The direction reversal necessary for reverse is achieved by engagement of the first, driven gear 32 and the sixth, driven gear 74, as noted above.

Figure 2:
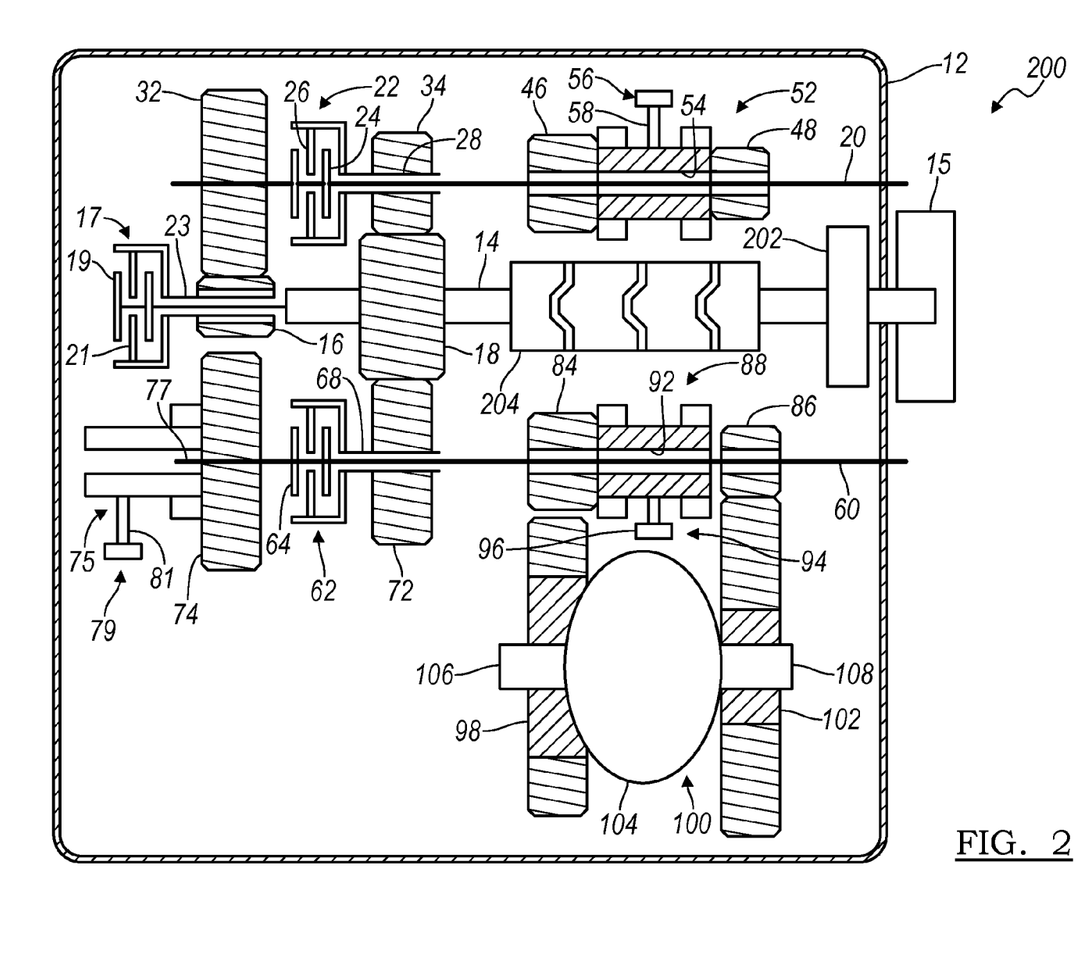
FIG. 2 is a diagrammatic view of another embodiment of a five speed layshaft transmission.

Turning to FIG. 2, another embodiment of a five speed transmission is illustrated and generally indicated by reference number 200. The transmission 200 is similar to the transmission 10 shown in FIG. 1 and like components are indicated by like reference numbers. However, the transmission 200 further includes a hydraulic pump 202 secured to and located within the housing 12. The pump 202 is driven by the input shaft 14 and supplies pressurized hydraulic or transmission fluid to various components of the transmission 200. However off axis configurations are also possible with the easy access to the input shaft 14. In addition, the transmission 200 includes a barrel cam 204 disposed on the input shaft 14 or optionally off axis parallel to the input shaft 14. The barrel cam 204 is configured to engage multiple actuators which may include actuators 56, 94 and/or 77 in order to shift the synchronizers 52, 88 and 75, respectively.

Figure 3:
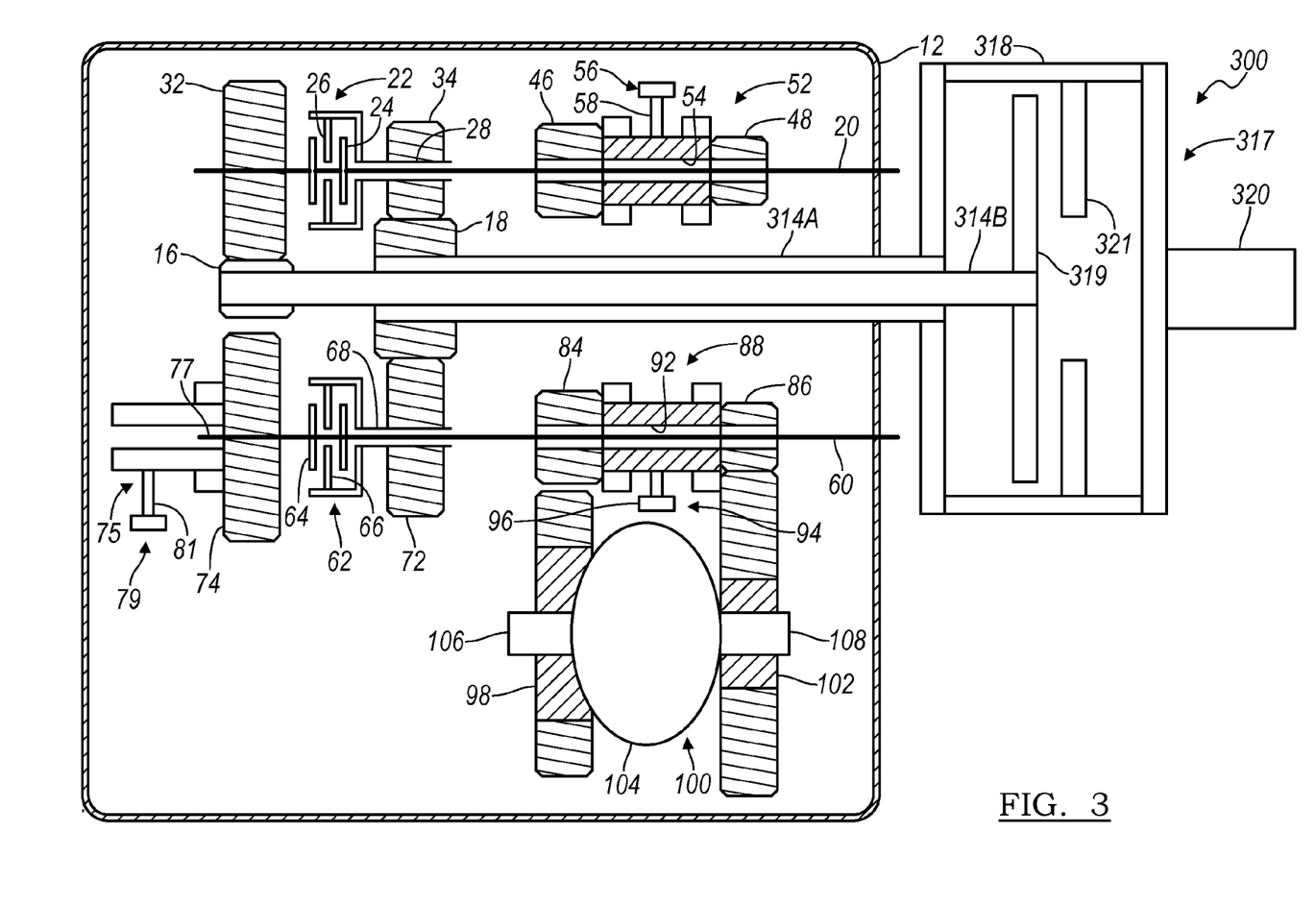
FIG. 3 is a diagrammatic view of yet another embodiment of a five speed layshaft transmission.

With reference to FIG. 3, another embodiment of a five speed layshaft transmission is illustrated and generally indicated by reference number 300. The transmission 300 is similar to the transmission 10 shown in FIG. 1 and like components are indicated by like reference numbers. However, the launch clutch 17 is replaced with a dry launch clutch 317. To accommodate the location of the dry launch clutch 317, the input shaft 14 is replaced with a sleeve shaft 314A and a center shaft 314B located concentrically within the sleeve shaft 314A. The sleeve shaft 314A is directly coupled with a hub 318 of the launch clutch 317. The hub 318 is in turn directly driven by an input shaft 320 interconnected to the prime mover (not shown). The drive gear 18 is rotatably connected to the sleeve shaft 314A.

The launch clutch 317 includes one or more clutch plates or discs 319 coupled to the center shaft 314B for rotation therewith. Interleaved with the one or more clutch plates or discs 319 are mating steels 321 that are coupled to and rotate with the hub 319. Optionally the mating steels 321 can be mated to the shaft and the friction elements can be mated to the hub or the steel functionality can be integrated into the flywheel or damper assembly. The launch clutch 317 is engageable to selectively transfer torque from the input shaft 320 to the center shaft 314B. The drive gear 16 is rotatably connected with the center shaft 314B.

Figure 4:
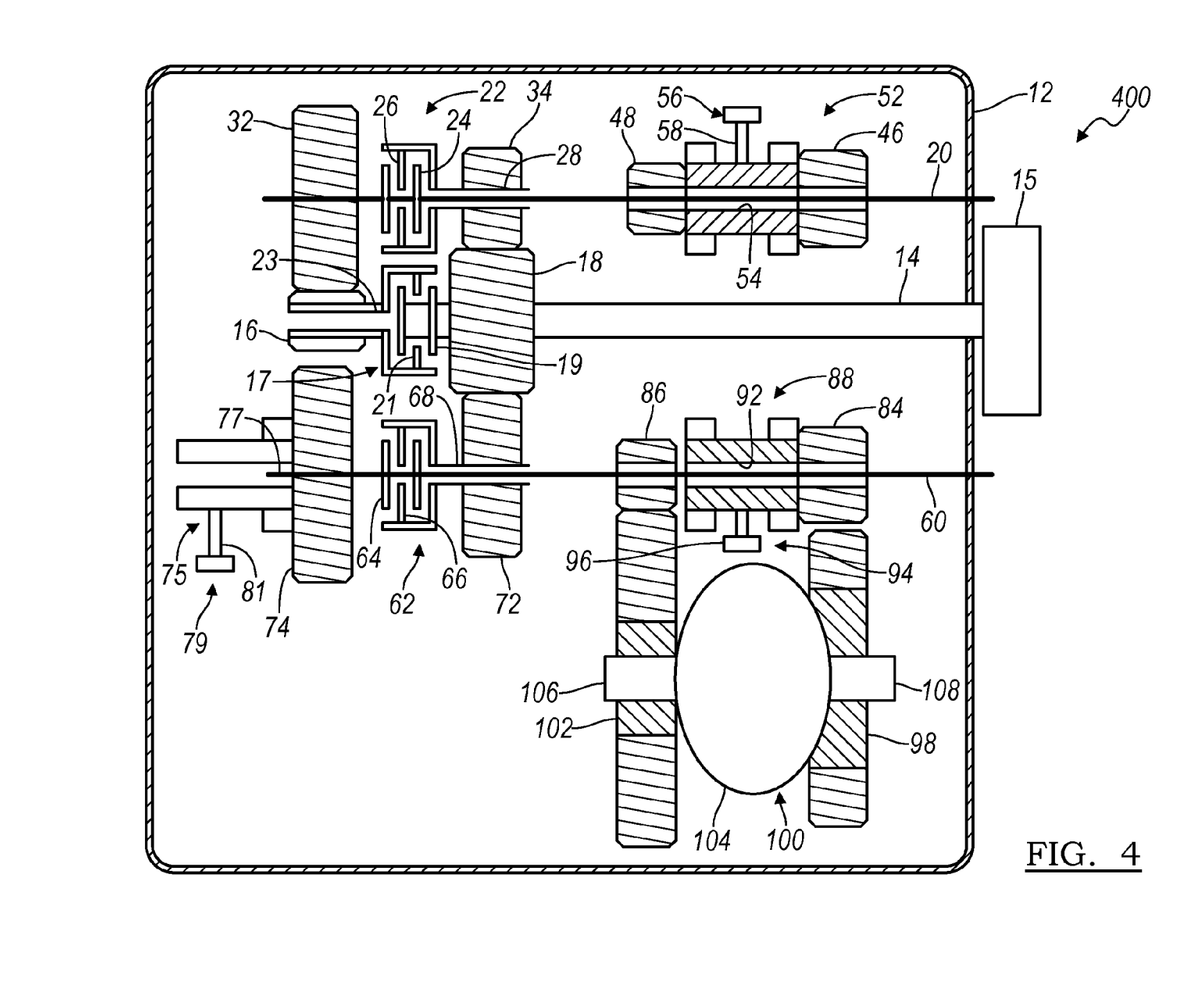
FIG. 4 is a diagrammatic view of yet another embodiment of a five speed layshaft transmission.

With reference to FIG. 4, another embodiment of a five speed layshaft transmission is illustrated and generally indicated by reference number 400. The transmission 400 is similar to the transmission 10 shown in FIG. 1 and like components are indicated by like reference numbers. However, the launch clutch 17 is disposed on the input shaft 14 axially between the gear 16 and the gear 18. In addition, gear sets 46, 84, and 98 have been axially switched with gear sets 48, 86, and 102. Thus, in operation, the transmission 400 provides first and third gear by translating the first synchronizer assembly 52 to the left rather than the right, fifth gear by translating the first synchronizer assembly 52 to the right rather than the left, reverse and second gear by translating the second synchronizer assembly 88 to the left rather than the right, and fourth gear by translating the second synchronizer assembly 88 to the right rather than the left. The gear ratios achieved and arrangement are merely for clarification and can vary depending on design. Locations of the clutch elements can also be changed as long as the function is preserved. For example clutches 22 and 26 can be placed to the right of gears 72 and 34 respectively.

Figure 5A:
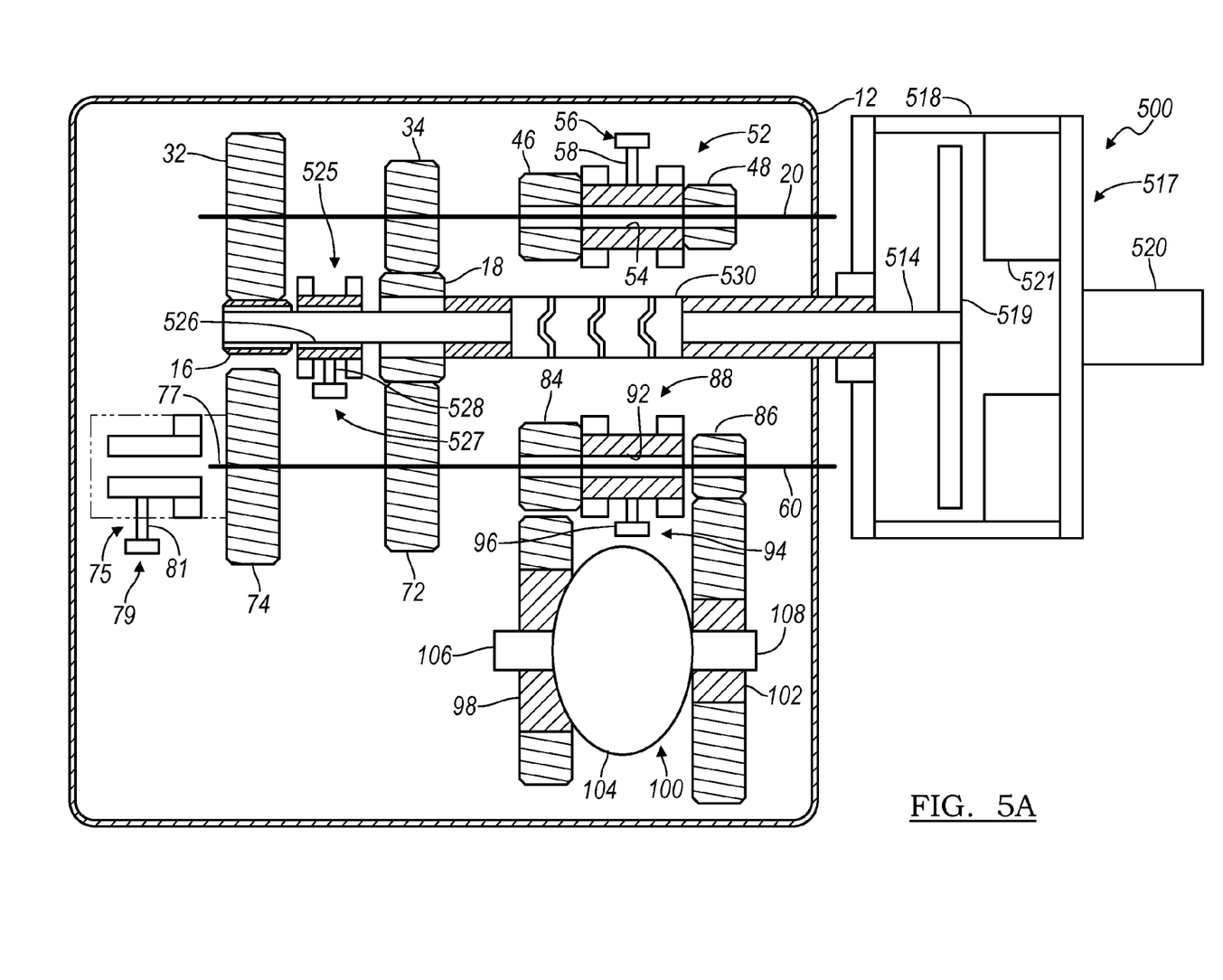
FIG. 5A is a diagrammatic view of yet another embodiment of a five speed layshaft transmission.

With reference to FIG. 5A, an embodiment of a manual five speed dual clutch transmission is illustrated and generally indicated by reference number 500. The transmission 500 is similar to the transmission 10 shown in FIG. 1 and like components are indicated by like reference numbers. In addition the transmission 500 incorporates some of the features of transmissions 200, 300, and 400. For example, the launch clutch 17 is replaced with a dry launch clutch 517. The manual transmission 500 includes an input shaft 514 coupled to the dry launch clutch 517. The dry launch clutch 517 includes one or more clutch plates or discs 519 coupled to the shaft 514 for rotation therewith. Interleaved with the clutch plates or discs 519 are mating steels 521 that are coupled to and rotate with the hub 518 or alternatively integrated into a flywheel assembly in a manner similar to a manual clutch. It should be appreciated that the clutch plates 519 and mating steels 521 may be reversed. The launch clutch 517 is engageable to selectively transfer torque from the input shaft 520 to the shaft 514.

The drive gears 16 and 18 are freely rotatably disposed on the shaft 514. A synchronizer clutch 525 is disposed between the drive gears 16 and 18. The synchronizer clutch 525 is rotationally coupled to the center shaft 514. A shift actuator assembly 527 which may be mechanical, hydraulic, electric or pneumatic, includes an output member and shift fork assembly 528 that engages and bi-directionally translates the synchronizer clutch assembly 525. When translated to the left from a neutral center position, the synchronizer clutch assembly 525 first synchronizes the speed of the adjacent gear 16 and then positively couples the synchronized gear to the shaft 514. It should be appreciated that the clutch plates 519 and mating steels 521 may be reversed. When translated to the right, the synchronizer clutch assembly 525 first synchronizes the speed of the adjacent gear 18 and then and then positively couples the synchronized gear to the shaft 514. In this arrangement, the clutches 22 and 66 are removed and gears 34 and 72 are rotationally fixed on the first and second countershafts 20 and 60, respectively. In addition, the synchronizer clutch 75 may be optionally removed depending upon design considerations.

Finally, a barrel cam 530 may be disposed on the input shaft 14 and configured to engage the actuators 56, 94, and 527 in order to shift the synchronizers 52, 88, and 526. However other means of actuation are still possible.

Figure 5B:
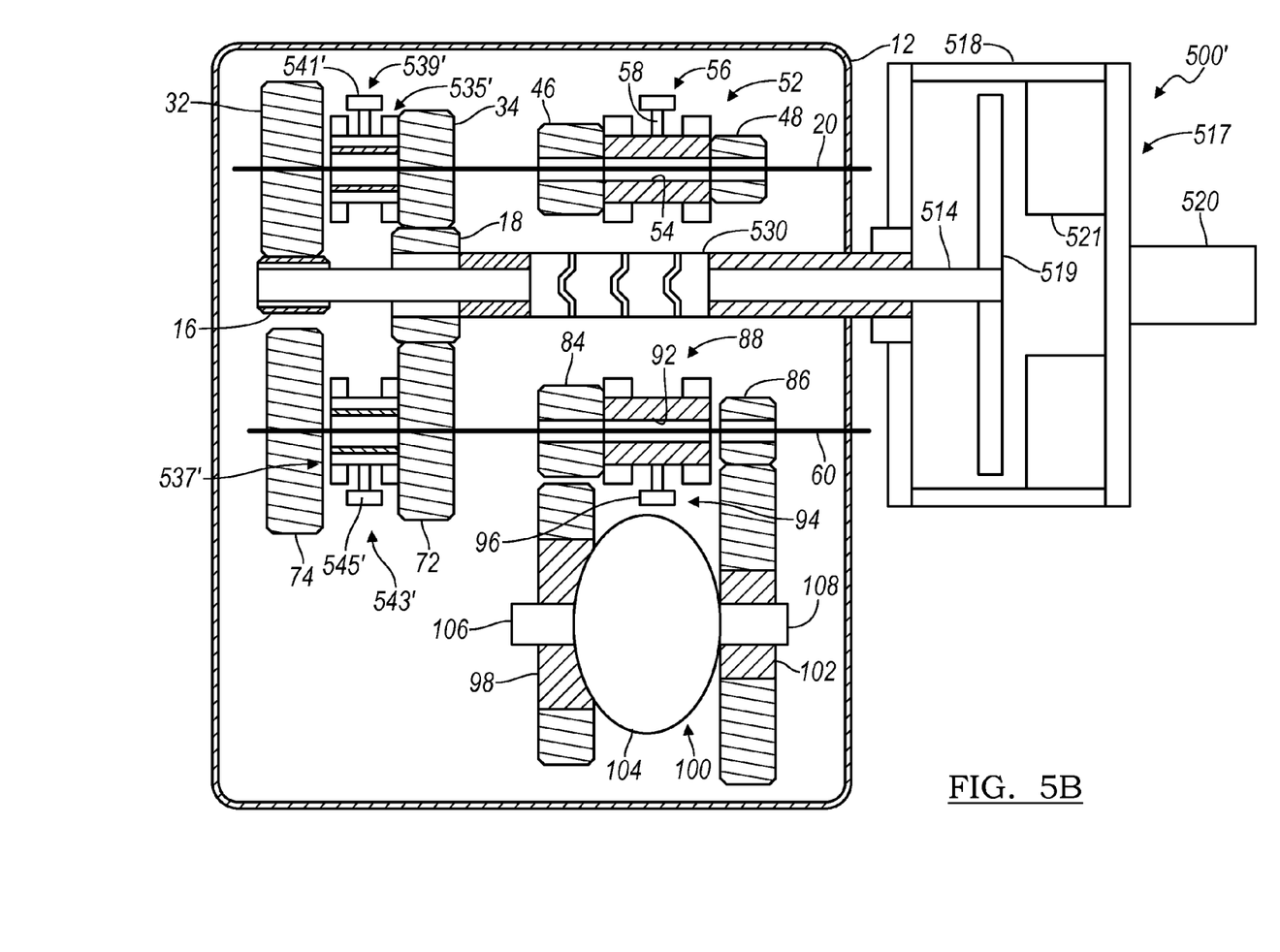
FIG. 5B is a diagrammatic view of yet another embodiment of a five speed layshaft transmission.

With reference to FIG. 5B, an alternate embodiment of a manual five speed dual clutch transmission is illustrated and generally indicated by reference number 500'. The transmission 500' is similar to the transmission 500 shown in FIG. 5A and like components are indicated by like reference numbers. In addition the transmission 500' incorporates some of the features of transmissions 200, 300, and 400. For example, the transmission 500' replaces the synchronizer clutch 525 shown in FIG. 5A with two synchronizer clutches 535' and 537'. A shift actuator assembly 539' which may be mechanical, hydraulic, electric or pneumatic, includes an output member and shift fork assembly 541' that engages and bi-directionally translates the synchronizer clutch assembly 525'. When translated to the left from a neutral center position, the synchronizer clutch assembly 535' first synchronizes the speed of the adjacent gear 32 and then positively couples the synchronized gear to the countershaft 20. When translated to the right, the synchronizer clutch assembly 535' first synchronizes the speed of the adjacent gear 34 and then positively couples the synchronized gear to the countershaft 20. A shift actuator assembly 543' which may be mechanical, hydraulic, electric or pneumatic, includes an output member and shift fork assembly 545' that engages and bi-directionally translates the synchronizer clutch assembly 537'. When translated to the left from a neutral center position, the synchronizer clutch assembly 537' first synchronizes the speed of the adjacent gear 74 and then positively couples the synchronized gear to the countershaft 60. When translated to the right, the synchronizer clutch assembly 537' first synchronizes the speed of the adjacent gear 72 and then positively couples the synchronized gear to the countershaft 60.

Figure 6:
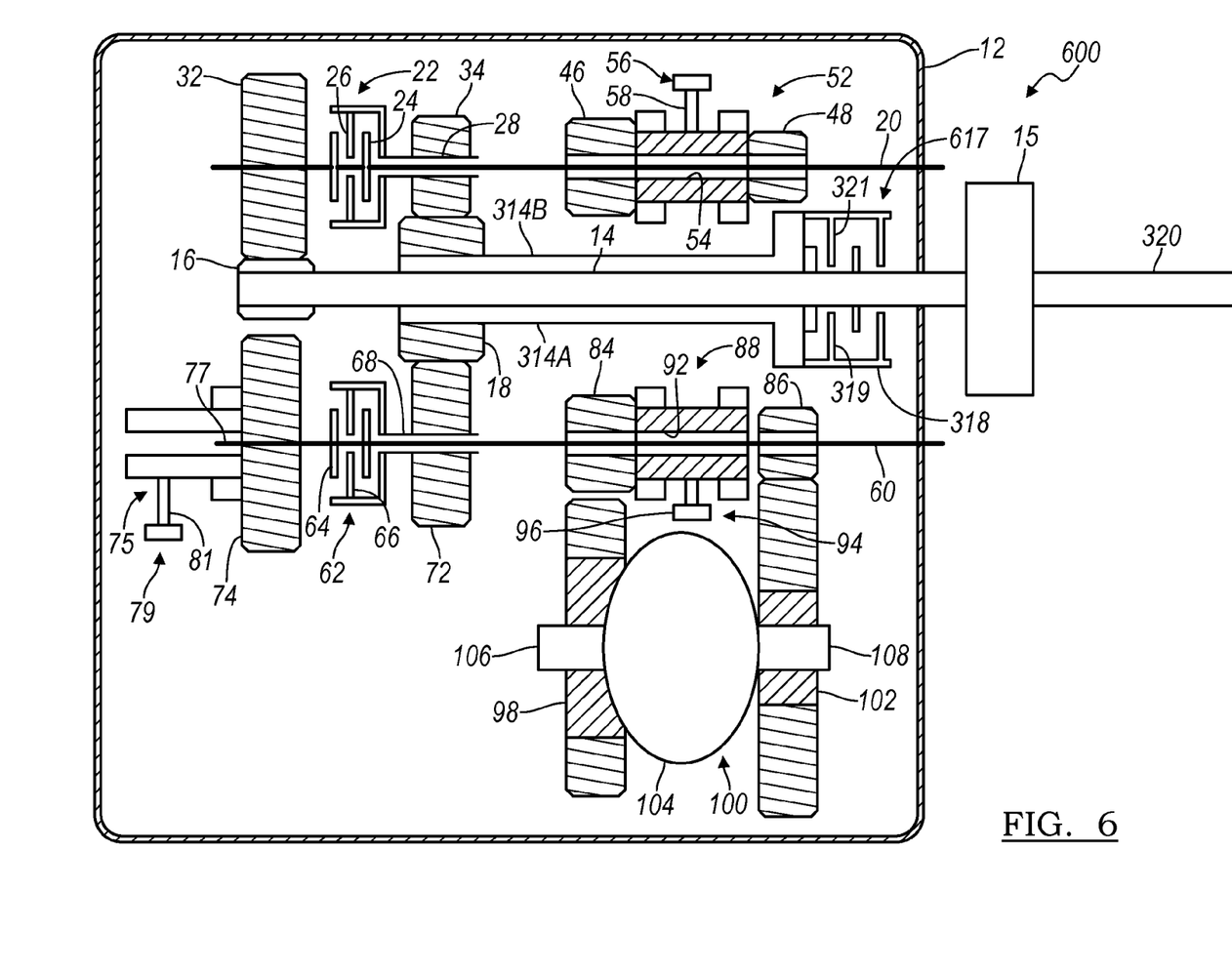
FIG. 6 is a diagrammatic view of yet another embodiment of a five speed layshaft transmission.

With reference to FIG. 6, another embodiment of a five speed dual clutch transmission is illustrated and generally indicated by reference number 600. The transmission 600 is similar to the transmission 300 shown in FIG. 3 and like components are indicated by like reference numbers. However, the launch clutch 317 is replaced with a wet launch clutch 617 located inside the housing 12. A flywheel damper assembly 619 is preferably disposed on the input shaft 320 outside the housing 12. The launch clutch 617 is preferably located axially between the gear 18 and the housing 12 proximate the flywheel damper assembly 619.

Figure 7:
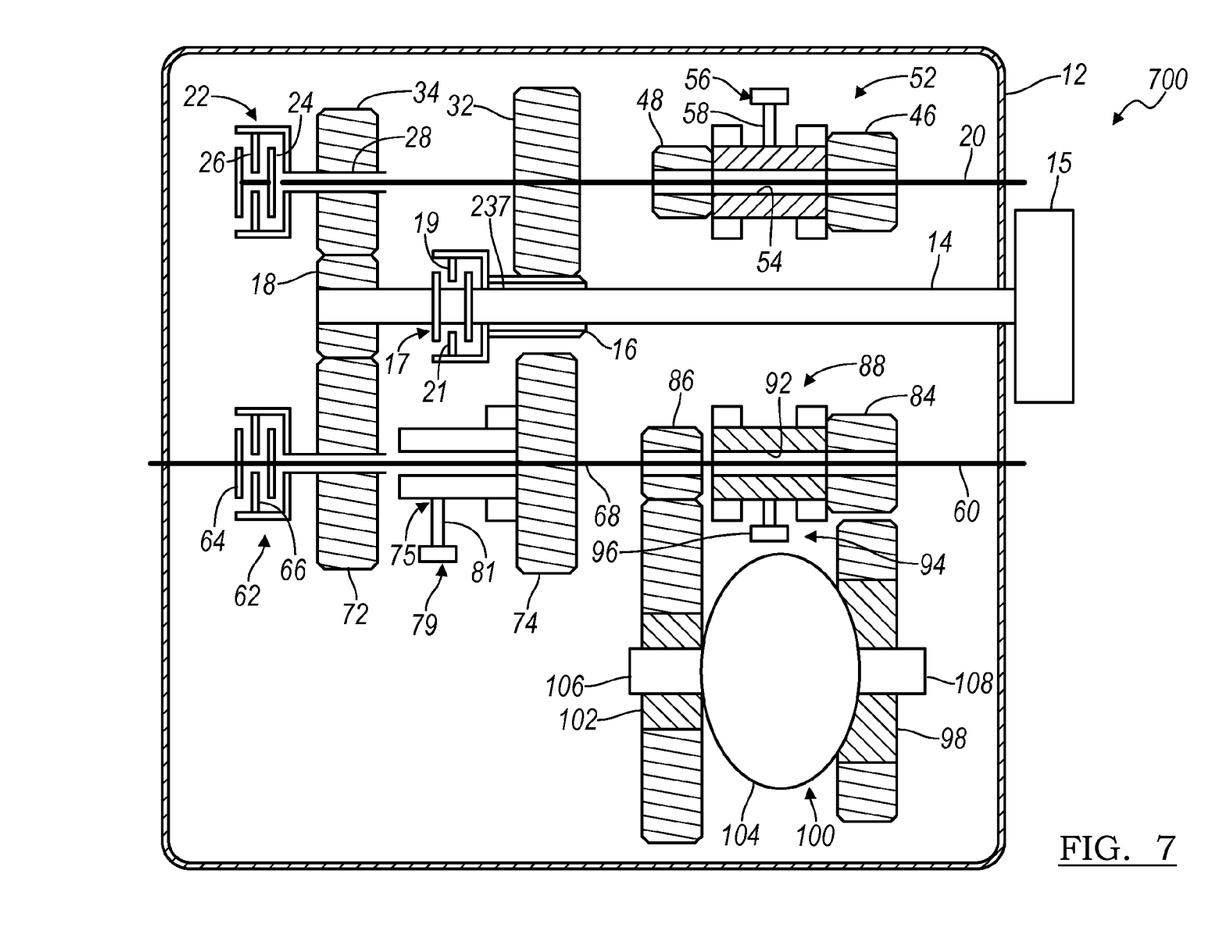
FIG. 7 is a diagrammatic view of yet another embodiment of a five speed layshaft transmission.

With reference to FIG. 7, another embodiment of a five speed dual clutch transmission is illustrated and generally indicated by reference number 700. The transmission 700 is similar to the transmission 10 shown in FIG. 1 and like components are indicated by like reference numbers. However, the gear sets 16, 32 and 74 have been axially switched with gear sets 18, 34 and 72. In addition, the launch clutch 17 is disposed between the gear sets 16 and 18 and the clutch assemblies 22 and 62 are disposed at ends of the countershafts 20 and 60, respectively.

Figure 8:
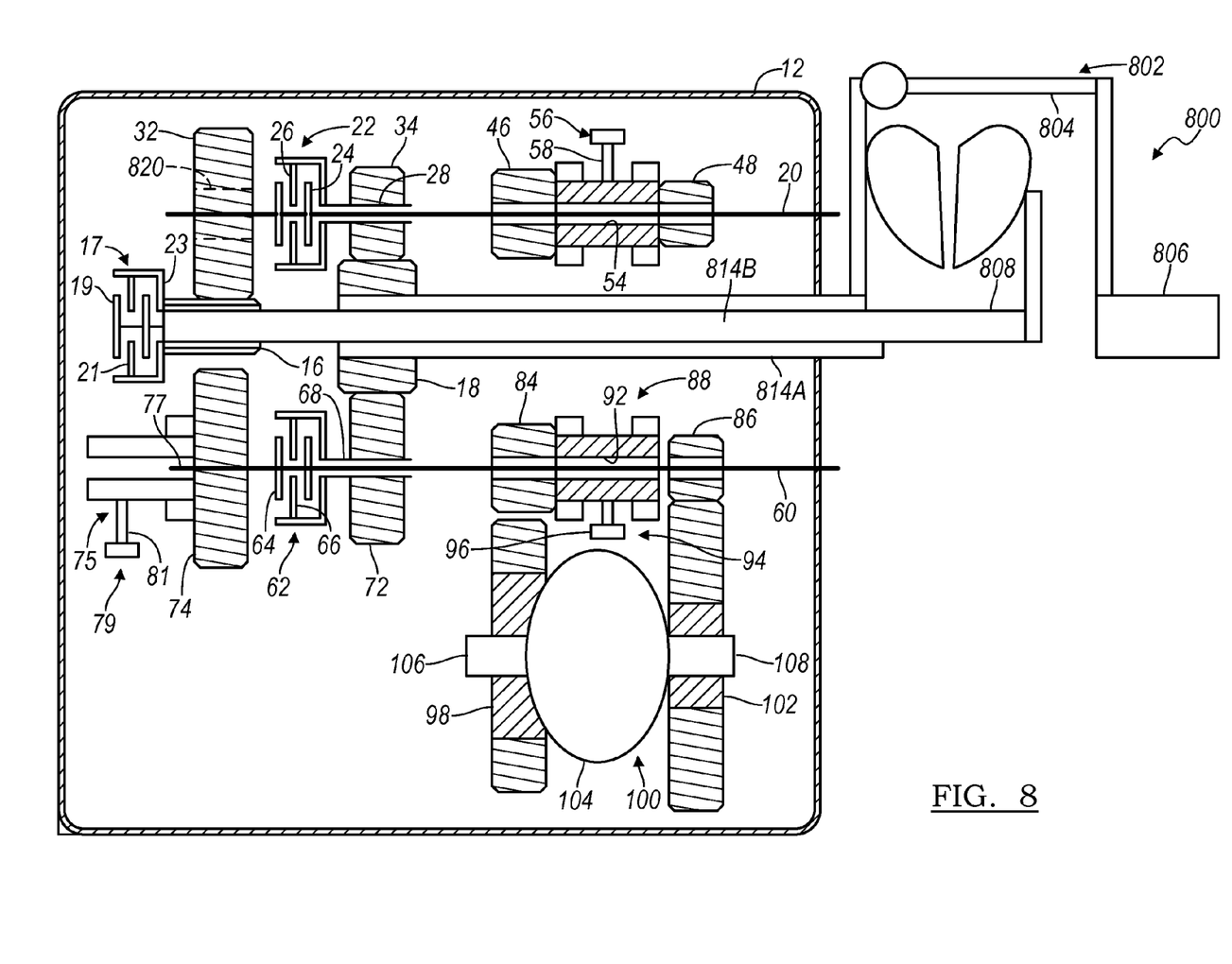
FIG. 8 is a diagrammatic view of yet another embodiment of a five speed layshaft transmission.

Finally, turning to FIG. 8, another embodiment of a five speed dual clutch transmission is illustrated and generally indicated by reference number 800. The transmission 800 is similar to the transmission 10 shown in FIG. 1 and like components are indicated by like reference numbers. However, the transmission 800 includes a hydraulic coupling or other hydrodynamic starting device 802. To accommodate the hydraulic coupling 802, the input shaft 14 is replaced with a sleeve shaft 814A and a center shaft 814B located concentrically within the sleeve shaft 814A. The sleeve shaft 814A is directly coupled with a pump 804 of the hydraulic coupling 802. The pump 804 is in turn directly driven by an input shaft 806 interconnected to the prime mover (not shown). The drive gear 18 is rotatably connected to the sleeve shaft 814A.

The pump 804 hydraulically drives a turbine 808. The turbine 808 is rotatingly coupled to the center shaft 814B. The drive gear 16 is selectively, rotatably connected with the center shaft 814B through the launch clutch 17. Alternatively the launch clutch 17 can be eliminated and a freewheel element 820 can be added to gear 32 as shown by dashed lines in FIG. 8.

The layshaft transmissions 10, 200, 300, 400, 500, 500' 600, 700, and 800 according to the present invention provide many features and benefits. For example, there are fewer planes of gears compared to an equivalent dual clutch transmission. Additionally, the input clutches are disposed on the axes of the quills and countershafts. All of these features permit a more axially compact transmission. In fact, the nominal axial distance between the input shaft and the center of the differential is smaller than in most dual clutch transmission configurations.

The solid input shaft improves hydraulic pump packaging and provides the potential for improved hybridization. The gear sets between the input shaft and the gears on the quills reduce quill, clutch and countershaft speeds and thus reduce spin losses in both the gears and the input clutches relative to conventional dual clutch transmission configurations.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
   a transmission housing;
   an input member connectable to a prime mover output member;
   a first drive gear selectively connectable for common rotation with the input member;
   a second drive gear rotatably fixed for common rotation with the input member;
   a launch device connected to the input member and to the first drive gear, wherein the launch device is selectively engageable to transmit torque from the input member to the first drive gear;
   a first countershaft rotatably supported within the transmission housing and spaced apart from and parallel with the input member;
   a second countershaft rotatably supported within the transmission housing and spaced apart from and parallel with the input member;
   a first driven gear rotatably fixed for common rotation with the first countershaft and in mesh with the first drive gear;
   a second driven gear selectively connectable for common rotation with the first countershaft and in mesh with the second drive gear;
   a third driven gear selectively connectable for common rotation with the second countershaft and in mesh with the second drive gear;
   a fourth driven gear selectively connectable for common rotation with the second countershaft and in mesh with the first driven gear;
   a first output gear selectively connectable for common rotation with the first countershaft;
   a second output gear selectively connectable for common rotation with the first countershaft;
   a third output gear selectively connectable for common rotation with the second countershaft;
   a fourth output gear selectively connectable for common rotation with the second countershaft;
   two torque transmitting assemblies each for selectively coupling one of the second and third driven gears with one of the first countershaft and the second countershaft; and
   three synchronizer assemblies each for selectively coupling one of the fourth driven gear, the first output gear, the second output gear, the third output gear, and the fourth output gear with at least one of the first countershaft and the second countershaft, and
   wherein the selective engagement of the launch device, the two torque transmitting assemblies, and the three synchronizer assemblies establishes at least one of five forward speed ratios and a reverse speed ratio.

2. The transmission of claim 1 wherein a first of the two torque transmitting assemblies selectively connects the second driven gear to the first countershaft.

3. The transmission of claim 2 wherein a second of the two torque transmitting assemblies selectively connects the third driven gear to the second countershaft.

4. The transmission of claim 3 wherein a first of the three synchronizer assemblies selectively connects or disconnects at least one of the first output gear and the second output gear to the first countershaft.

5. The transmission of claim 4 wherein a second of the three synchronizer assemblies selectively connects or disconnects at least one of the third output gear and the fourth output gear to the second countershaft.

6. The transmission of claim 5 wherein a third of the three synchronizer assemblies selectively connects the fourth driven gear to the second countershaft.

7. The transmission of claim 1 wherein the launch device is a wet clutch and is rotationally supported within the transmission housing.

8. The transmission of claim 1 wherein the launch device is a dry clutch.

9. The transmission of claim 1 further comprising a barrel cam disposed on or parallel to the input member and operable to actuate at least two of the three synchronizer assemblies.

10. The transmission of claim 1 further comprising a hydraulic pump driven by the input shaft and supported within the housing.

11. The transmission of claim 1 wherein the first drive gear, the first driven gear, and the fourth driven gear form a first co-planar gear set, the second drive gear, the second driven gear, and the third driven gear form a second co-planar gear set, the first output gear and the third output gear form a third co-planar gear set, and the second output gear and the fourth output gear form a fourth co-planar gear set.

12. The transmission of claim 11 wherein at least one of the co-planar gear sets is a stepped co-planar gear set.

13. The transmission of claim 11 wherein the first co-planar gear set is proximate a rear wall of the housing, the fourth co-planar gear set is proximate a front wall of the housing, the second co-planar gear set is disposed between the first co-planar gear set and the fourth co-planar gear set, and the third co-planar gear set is disposed between the second co-planar gear set and the fourth co-planar gear set.

14. The transmission of claim 11 wherein the second co-planar gear set is proximate a rear wall of the housing, the fourth co-planar gear set is proximate a front wall of the housing, the first co-planar gear set is disposed between the second co-planar gear set and the fourth co-planar gear set, and the third co-planar gear set is disposed between the first co-planar gear set and the fourth co-planar gear set.

15. The transmission of claim 11 wherein the launch device is disposed between the first and second co-planar gear sets.

* * * * *